(12) United States Patent
Lopez-Perez et al.

(10) Patent No.: US 10,136,331 B2
(45) Date of Patent: Nov. 20, 2018

(54) ENHANCING COEXISTENCE ON UNLICENSED FREQUENCY BANDS USING ADAPTIVE CLEAR-TO-SEND-TO-SELF MESSAGES

(71) Applicant: Alcatel Lucent, Boulogne-Billancourt (FR)

(72) Inventors: David Lopez-Perez, Blanchardstown (IE); Mohammad R. Khawer, Lake Hopatcong, NJ (US); Jonathan Ling, North Brunswick, NJ (US)

(*) Notice: Subject to any disclaimer, the term of this patent is extended or adjusted under 35 U.S.C. 154(b) by 120 days.

(21) Appl. No.: 15/235,738

(22) Filed: Aug. 12, 2016

(65) Prior Publication Data
US 2018/0049037 A1 Feb. 15, 2018

(51) Int. Cl.
| | | |
|---|---|---|
| *H04W 16/04* | (2009.01) | |
| *H04W 72/12* | (2009.01) | |
| *H04W 52/32* | (2009.01) | |
| *H04W 74/08* | (2009.01) | |
| *H04W 16/14* | (2009.01) | |
| *H04W 72/04* | (2009.01) | |
| *H04W 72/08* | (2009.01) | |
| *H04W 84/12* | (2009.01) | |
| *H04W 88/08* | (2009.01) | |

(52) U.S. Cl.
CPC ......... *H04W 16/14* (2013.01); *H04W 52/325* (2013.01); *H04W 72/1215* (2013.01); *H04W 74/0816* (2013.01); *H04W 72/044* (2013.01); *H04W 72/0473* (2013.01); *H04W 72/082* (2013.01); *H04W 84/12* (2013.01); *H04W 88/08* (2013.01)

(58) Field of Classification Search
CPC ............. H04W 16/14; H04W 72/1215; H04W 72/044; H04W 72/082; H04W 72/0473; H04W 88/08; H04W 84/12; H04W 52/325; H04W 74/0816
See application file for complete search history.

(56) References Cited

U.S. PATENT DOCUMENTS

| | | | | |
|---|---|---|---|---|
| 2015/0223244 A1* | 8/2015 | Tabet | ..................... | H04W 72/12 370/329 |
| 2017/0048879 A1* | 2/2017 | Zhang | ................... | H04W 72/12 |
| 2017/0142235 A1* | 5/2017 | Zhang | ..................... | H04L 45/74 |

OTHER PUBLICATIONS

Abhijeet Bhorkar, et al., "Medium Access Design for LTE in Unlicensed Band", 8th International Wireless Distributed Networks Workshop on Cooperative and Heterogeneous Cellular Networks, 2015, 5 pages.

* cited by examiner

*Primary Examiner* — Jianye Wu

(57) ABSTRACT

A base station operates according to a first radio access technology (RAT) that requires synchronization on timing synchronization boundaries. The base station acquires a channel of an unlicensed frequency band and generates a clear-to-send message that is decodable by access points that operate according to a second RAT that does not require synchronization on the timing synchronization boundaries. The base station transmits the clear-to-send message during a time interval between acquisition of the channel and a subsequent timing synchronization boundary.

20 Claims, 7 Drawing Sheets

ENHANCING COEXISTENCE ON UNLICENSED FREQUENCY BANDS USING ADAPTIVE CLEAR-TO-SEND-TO-SELF MESSAGES

BACKGROUND

Field of the Disclosure

The present disclosure relates generally to wireless communication systems and, more particularly, to coexistence on unlicensed frequency bands of wireless communication systems.

Description of the Related Art

Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 gigahertz (GHz) to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 megahertz (MHz), a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider.

Wireless communication devices that transmit or receive signals in licensed or unlicensed frequency bands are typically referred to as nodes, which may include Wi-Fi access points that operate according to IEEE 802.11 standards in the unlicensed spectrum. For example, Wi-Fi access points may operate according to IEEE Standard 802.11ac™-2013 or IEEE Standard 802.11n™-2009, which are incorporated herein by reference in their entirety. Nodes also include base stations that operate in the licensed spectrum according to standards such as Long Term Evolution (LTE) standards defined by the Third Generation Partnership Project (3GPP). Base stations that operate according to LTE can implement supplementary downlink (SDL) channels in the unlicensed spectrum to provide additional bandwidth for downlink communications to user equipment that are also communicating with the base station using channels in a licensed frequency band. For example, the base station may operate according to the LTE-U SDL Coexistence Specifications v1.3 (2015), which is incorporated herein by reference in its entirety. The licensed frequency bands may be referred to as LTE-L bands and the unlicensed frequency bands may be referred to as LTE-U bands. Base stations may also operate in the unlicensed frequency bands according to Licensed Assisted Access (LAA) standards such as 3GPP TR 36.889 V13.0.0 (2015-06)-Study on Licensed Assisted Access to Unlicensed Spectrum (Release 13), which is incorporated herein by reference in its entirety. Base stations may also operate solely in the unlicensed frequency bands without support in licensed frequency bands, e.g., according to emerging standards such as MuLTEFire.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
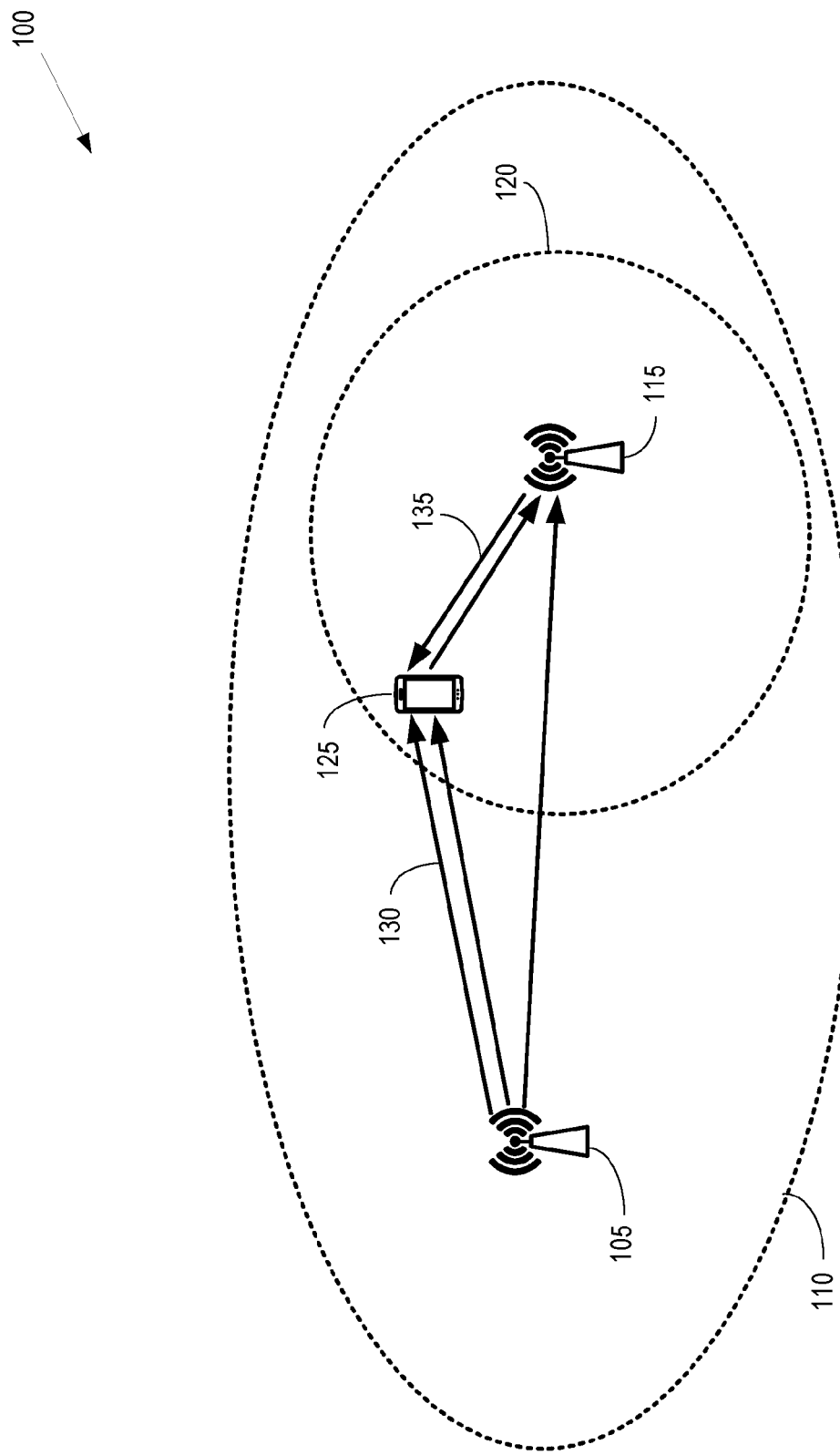
FIG. 1 is a diagram of a wireless communication system according to some embodiments.

In dense networks, channels in unlicensed frequency bands of a wireless communication system can be reused by nodes that operate according to different radio access technologies (RATs) such as Wi-Fi access points and LTE base stations. Communication by the nodes that operate according to the different RATs is coordinated to reduce interference between transmissions by the different nodes. For example, listen before talk (LBT) coexistence rules require that each node monitors a channel (e.g., "listens") to detect energy on the channel prior to transmitting information on the channel. If the detected energy level is below a threshold level, the node is free to transmit on the channel for a predetermined time interval such as 4 milliseconds (ms) or 10 ms. If the detected energy level is above the threshold level, which indicates that another node is transmitting on the channel, the listening node backs off for a random time interval before making another attempt to acquire the channel. The energy detection threshold for Wi-Fi is −62 decibel-milliwatts (dBm), the energy detection threshold for LTE-U is −72 dBm, and the energy detection threshold for LAA is −72 dBm. Wi-Fi nodes can also perform Wi-Fi preamble decoding on signals with detected energy levels below the energy detection threshold and above −82 dBm. The Wi-Fi node backs off if it successfully decodes preambles in transmissions by other Wi-Fi nodes at an energy level between −62 dBm and −82 dBm.

Signals transmitted according to a first RAT (such as LTE-U, LAA, or MULTEFire) in the unlicensed frequency band do not use the same frame structure as signals transmitted according to a second RAT such as Wi-Fi. The Wi-Fi node is therefore not able to identify interfering LTE-U, LAA, or MULTEFire transmissions at energy levels below −62 dBm and does not back off in the presence of such transmissions. Nodes that operate according to LTE-U, LAA, or MULTEFire are not able to identify Wi-Fi transmissions at energy levels below −72 dBm. The LTE-U, LAA, and MULTEFire nodes therefore do not back off in the presence of such transmissions. Similarly, nodes that are owned or operated by different operators may not back off in response to detecting each other's signals at strengths below −72 dBm. Consequently, transmissions by Wi-Fi nodes, LTE-U nodes, LAA nodes, and MULTEFire nodes on channels of the unlicensed frequency bands are likely to interfere with transmissions by other nodes on the same channels at energy levels between −62 dBm and −82 dBm (or lower). This interference increases error rates at the receiving nodes, which causes the node to reduce its transmission rate and its throughput.

Furthermore, base stations that operate according to LTE-U, LAA, or MULTEFire are synchronized across frame/subframe boundaries and are constrained to begin data transmissions on subframe boundaries. Thus, if the base station acquires a channel in the unlicensed frequency band during the current subframe, the base station cannot begin data transmissions until the next subframe boundary. In some scenarios, the base station can implement partial subframes, which add additional boundaries to further subdivide the frame. However, the base station is still constrained to begin transmissions on one of these timing synchronization boundaries. Consequently, the base stations have to transmit a reservation signal or preamble in response to channel acquisition and continue transmitting reservation signal until the next timing synchronization boundary to mark the channel as occupied to prevent other co-existing nodes from acquiring the channel during this time interval. In contrast, Wi-Fi access points are able to begin transmissions on channels of the unlicensed frequency band as soon as the Wi-Fi access point acquires the channel regardless of the location of subframe boundaries used by neighboring LTE-U or LAA base stations. In the absence of a reservation signal, a Wi-Fi access point can therefore acquire a channel in the time interval between acquisition of the channel by an LTE-U or LAA base station and a subframe boundary because the base station is not transmitting during this time interval and cannot be detected by the access point. Transmissions by the access point will then collide with transmissions by the base station when the base station begins transmitting at the subframe boundary. The problem of collisions between Wi-Fi and LTE-U/LAA transmissions on subframe boundaries is further exacerbated by the presence of transmissions that are received at signal strengths below the energy detection threshold, e.g., for received signal strengths between −62 dBm and −82 dBm (or lower).

Collisions between transmissions on a channel of an unlicensed frequency band from base stations that operate according to a first RAT (such as LTE-U, LAA, or MULTEFire) and access points that operate according to a second RAT (such as Wi-Fi) can be avoided on timing synchronization boundaries defined by the first RAT if the base station transmits one or more clear-to-send messages during a time interval between acquisition of the channel of the unlicensed frequency band by the base station and a subsequent timing synchronization boundary. The clear-to-send messages are generated according to the second RAT and can be transmitted by themselves or as part of a channel reservation signal or preamble. Clear-to-send messages that are used to reserve a channel for the transmitting base station can also be referred to as clear-to-send-to-self messages. The clear-to-send messages are decodable by access points that operate according to the second RAT and include information indicating how long the channel is reserved for transmission by the base station.

In some variations, base stations transmit multiple clear-to-send messages during the time interval between acquisition of the channel of the unlicensed frequency band and a subsequent timing synchronization boundary. The clear-to-send messages therefore reserve the channel until the next timing synchronization boundary. The base station can then transmit data beginning at the timing synchronization boundary. The timing synchronization boundaries can include frame boundaries, subframe boundaries, partial subframe boundaries, and the like. User equipment that receive the clear-to-send messages can forward the clear-to-send messages for reception by access points that are hidden from the originating base station.

Some access points are able to decode the clear-to-send messages at signal strengths below −82 dBm and in some cases as low as −90 dBm. These access points back off in response to detecting the clear-to-send messages on a channel in the unlicensed frequency band. Thus, base stations can force relatively distant access points to back off by transmitting the clear-to-send messages at the highest permitted transmission power, which can reduce channel reuse by increasing the distance between cells that are able to use the same channel at the same time. Transmitting the clear-to-send messages at a high power level can therefore negatively impact the overall spectral efficiency of the network.

To address this issue, the base stations can modify transmission powers for the clear-to-send messages based on estimated distances between the base station and one or more access points. In some variations, the base station estimates the distances to access points based on a signal strength received on the channel of the unlicensed frequency band from the access points. For example, the base station can selectively transmit the clear-to-send message if the received signal strength of a Wi-Fi beacon is above a threshold (e.g., −80 dBm), which indicates that the access point is relatively close to the base station and therefore likely to cause significant interference if their signals collide. The base station bypasses transmission if the received signal strength is below the threshold, which indicates that the access point is relatively far from the base station and therefore unlikely to cause significant interference even if their signals collide. For another example, the base station can estimate path losses to access points based on the received signal strengths of beacon signals received from the access points. The access points are grouped into a first subset of access points that have path losses below a threshold (indicating that the first subset are relatively close to the base station) and a second subset of access points that have path losses above a threshold (indicating that the access points in the second subset are relatively far from the base station). The base station can then determine a transmission power for the clear-to-send message based on the path losses so that the first subset of the access points receives the clear-to-send message and the second subset does not receive the clear-to-send message.

FIG. 1 is a diagram of a wireless communication system 100 according to some embodiments. The wireless communication system 100 includes one or more base stations 105 that provide wireless connectivity according to a first radio access technology (RAT), e.g., according to the LTE standards defined by the Third Generation Partnership Project (3GPP). The first RAT requires that the base stations 105 are synchronized on timing synchronization boundaries such as frame boundaries, subframe boundaries, or, in some cases, partial subframe boundaries. Thus, transmissions from the base stations 105 that are configured according to the first RAT are constrained to begin on a timing synchronization boundary. In the interest of clarity, the term "base station" will be used herein to indicate an entity that provides wireless connectivity according to the first RAT that requires timing synchronization between other base stations. However, persons of ordinary skill in the art will appreciate that entities providing wireless connectivity according to a first RAT can be referred to using other terms. For example, the base station 105 can be referred to as an eNodeB, a base station router, a macrocell, or using other terms.

The base station 105 provides wireless connectivity within a first geographical area or cell 110. In some variations, the base station 105 provides the wireless connectivity on channels of a licensed frequency band. For example, the base station 105 can operate according to LTE-L standards for providing uplink or downlink communications on channels of a licensed frequency band. The base station 105 is also able to provide wireless connectivity on channels of one or more unlicensed frequency bands according to the LTE-U SDL Coexistence Specifications v1.3 (2015), which is incorporated herein by reference in its entirety, the Licensed Assisted Access (LAA) standards such as the 3GPP TR 36.889 V13.0.0 (2015-06)-Study on Licensed Assisted Access to Unlicensed Spectrum (Release 13), which is incorporated herein by reference in its entirety, MULTEFire, or other standards that govern communication in the unlicensed frequency bands. The unlicensed frequency bands may include the Unlicensed National Information Infrastructure (UNII), which is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. The base station 105 can acquire channels of the unlicensed frequency band at any time (e.g., using LBT clear channel assessment). However, due to the requirement of timing synchronization between different base stations, the base station 105 is not able to begin data transmission of messages that are formed according to the first RAT until the next subsequent timing synchronization boundary.

Some embodiments of the base station 105 operate according to fifth-generation (or 5G) standards for wireless communication. The 5G standards specify data rates of tens of megabits per second that can be supported for tens of thousands of concurrent users, several hundreds of thousands of simultaneous connections, improved spectral efficiency relative to LTE, reduce latency relative to LTE, and the like.

The wireless communication system 100 also includes one or more access points 115 that provide wireless connectivity according to a second RAT such as Wi-Fi, as defined by the IEEE 802 standards. For example, the access point 115 can operate according to IEEE Standard 802.11ac™-2013 or IEEE Standard 802.11n™-2009, which are incorporated herein by reference in their entirety. The second RAT does not require that the access points be synchronized on any timing synchronization boundaries. Transmission of messages formed according to the second RAT can therefore be transmitted at any time regardless of the location of any timing synchronization boundaries that may be defined according to other RATs. In the interest of clarity, the term "access point" will be used herein to indicate an entity that provides wireless connectivity according to the second RAT that does not require timing synchronization between other access points. However, persons of ordinary skill in the art will appreciate that entities providing wireless connectivity according to a second RAT can be referred to using other terms.

The access point 115 provides wireless connectivity within a second geographical area or cell 120, which fully or partially overlaps with the cell 110. The access point 115 supports wireless connectivity over channels of one or more unlicensed frequency bands according to the second RAT within the cell 110. For example, the access point 115 can support wireless connectivity over channels that operate according to conventional Wi-Fi or carrier-grade Wi-Fi, which supports additional functionality such as user authentication, mobility management, and the like. The second RAT does not require timing synchronization on boundaries such as frame boundaries, subframe boundaries, or partial subframe boundaries. The access point 115 is therefore able to begin transmission on channels of an unlicensed frequency band as soon as the access point 115 has acquired the channel.

The base station 105 and the access point 115 support wireless communication with user equipment 125 over one or more channels of one or more unlicensed frequency bands within the respective cells 110, 120. Examples of user equipment 125 include wireless communication devices that operate according to LTE, machine-to-machine (M2M) devices, smart phones, mobile terminals, wireless-enabled tablets, wireless network interface cards, Wi-Fi sticks, radio transceivers integrated with sensors, 5G transceivers, 5G radio terminals, and the like. The user equipment 125 is located within the boundaries of both of the overlapping cells 110, 120. The base station 105 and the access point 115 are therefore able to support wireless communication with the user equipment 125. For example, the base station 105 can transmit data to the user equipment 125 on a channel of the unlicensed frequency band, as indicated by the arrow 130. The access point 115 can also transmit data to the user equipment 125 on the channel of the unlicensed frequency band, as indicated by the arrow 135.

The base station 105 and the access point 115 have to acquire the channel of the unlicensed frequency band before they are able to transmit on the channel. Channel acquisition can be performed on the basis of LBT or other clear channel assessment techniques that are known in the art. However, as discussed herein, timing synchronization requirements do not permit the base station 105 to begin data transmissions until a timing synchronization boundary, whereas the access point 115 can begin data transmission as soon as the access point 115 has acquired the channel. The different behaviors of the base station 105 and the access point 115 can therefore lead to collisions on the timing synchronization boundaries, as discussed herein. To reduce the number of collisions on timing synchronization boundaries, the base station 105 generates a clear-to-send message according to the second RAT so that the clear-to-send message is decodable by the access point 115. The base station 105 can then transmit the clear-to-send message during a time interval between acquisition of the channel and the next timing synchronization boundary. The access point 115 is able to decode the clear-to-send message and detect the presence of the base station 105 on the channel even if the message is received at a signal strength below the energy detection threshold. The access point 115 can therefore back off to avoid collisions on the subsequent timing synchronization boundary and for the duration of the time that the channel is reserved for the base station 105.

In some variations, the user equipment 125 receives signaling from the base station 105 and generates one or more clear-to-send messages in response to receiving the signaling. For example, the user equipment 125 can receive clear-to-send messages transmitted by the base station 105 according to the second RAT or preambles transmitted by the base station 105 according to the first RAT. In response to receiving the preamble or the clear-to-send message, the user equipment 125 generates and transmits a clear-to-send message according to the second RAT. The clear-to-send message transmitted by the user equipment 125 is used to reserve the channel of the unlicensed frequency band for the base station 105 and can therefore include information indicating a duration of time that the channel is reserved for transmission by the base station 105. The user equipment 125 can also be configured to selectively transmit the clear-to-send message based on the received signal strengths of signals received from access points or determine a transmission power for the clear-to-send message based on the received signal strengths, as discussed herein. Configuring the user equipment 125 in this manner helps to address the hidden node problem by allowing the user equipment 125 to transmit clear-to-send messages that are decodable by access points that are not necessarily visible to the base station 105.

Figure 2:
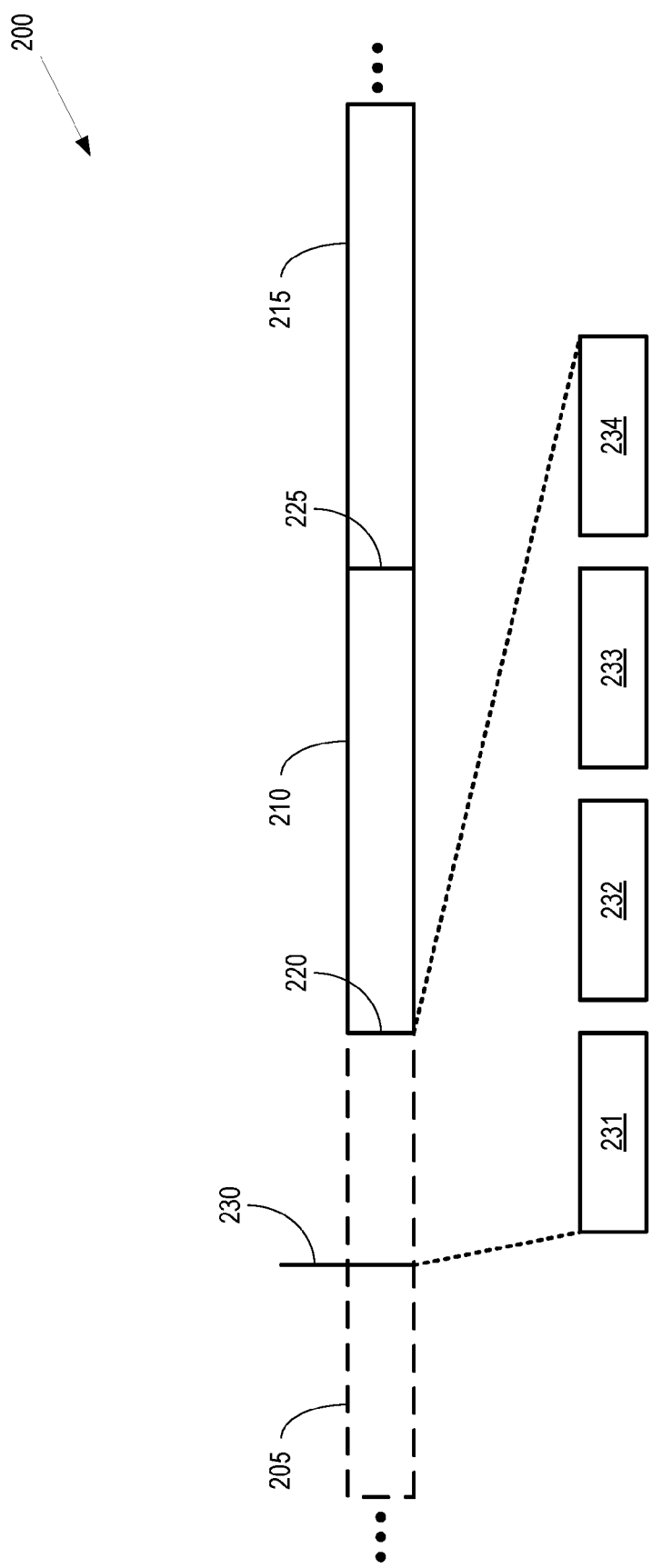
FIG. 2 is a diagram that illustrates timing synchronization boundaries used to synchronize communication by base stations that operate according to a first radio access technology (RAT) according to some embodiments.

FIG. 2 is a diagram 200 that illustrates timing synchronization boundaries used to synchronize communication by base stations that operate according to a first RAT according to some embodiments. The diagram 200 includes successive time intervals 205, 210, 215 that are separated by timing synchronization boundaries 220, 225. The successive time intervals 205, 210, 215 can be successive frames, subframes, partial subframes, or other time intervals. The timing synchronization boundaries 220, 225 can therefore be frame boundaries, subframe boundaries, partial subframe boundaries, or other boundaries between other time intervals. In the illustrated embodiment, a base station acquires a channel in an unlicensed frequency band at an acquisition time 230 that is within the subframe represented by time interval 205. However, due to timing synchronization requirements, the base station is not able to transmit data according to the first RAT during a time interval between the acquisition time 230 and the subsequent timing synchronization boundary 220, which corresponds to a portion of the time interval 205, as indicated by the dashed box.

The base station generates one or more clear-to-send messages 231, 232, 233, 234, which are collectively referred to herein as "the clear-to-send messages 231-234." The base station generates the clear-to-send messages 231-234 according to the second RAT so that the access points can decode the clear-to-send messages 231-234. The clear-to-send messages 231-234 include information indicating a duration of the time that the channel of the unlicensed frequency band is reserved for use by the base station. For example, the clear-to-send messages 231-234 can include information indicating a time interval between the acquisition time 230 and the timing synchronization boundary 220 plus a time interval reserved for transmission of data by the base station, which includes one or more of the time intervals 210, 215. For another example, the clear-to-send messages 231-234 can include information indicating corresponding time intervals between a transmission time of the corresponding clear-to-send message 231-234 and the timing synchronization boundary 220 plus a time interval reserved for transmission of data by the base station, which includes one or more of the time intervals 210, 215. Reception of the clear-to-send messages 231-234 by the access points informs the access points that they should back off and bypass transmission for at least the duration of the time that the channel of the unlicensed frequency band is reserved for use by the base station. For example, the clear-to-send messages 231-234 can indicate that the base station has reserved time intervals 210, 215 for transmission, as indicated by the solid boxes. Generating the clear-to-send messages 231-234 in a format that can be decoded by the access points allows the access points to detect the presence of the base station on the channel of the unlicensed frequency band even at signal strengths below an energy detection threshold.

The base station transmits the clear-to-send messages 231-234 on the channel of the unlicensed frequency band in order to prevent access points, which operate according to a second RAT and are not constrained by the timing synchronization requirements of the first RAT, from acquiring the channel during the time interval between the acquisition time 230 and the timing synchronization boundary 220. In some variations, the clear-to-send messages 231-234 are transmitted with reservation signals or as part of a preamble such as an LAA preamble that can be transmitted by the base station. The reservation signals or the preamble can be generated according to the first RAT so that they are not decodable by the access points. Although four clear-to-send messages 231-234 are shown in FIG. 2, the base station can determine the number of clear-to-send messages 231-234 based on the duration of the clear-to-send messages 231-234 and the duration of the time interval between the acquisition time 230 and the subsequent timing synchronization boundary 220.

Figure 3:
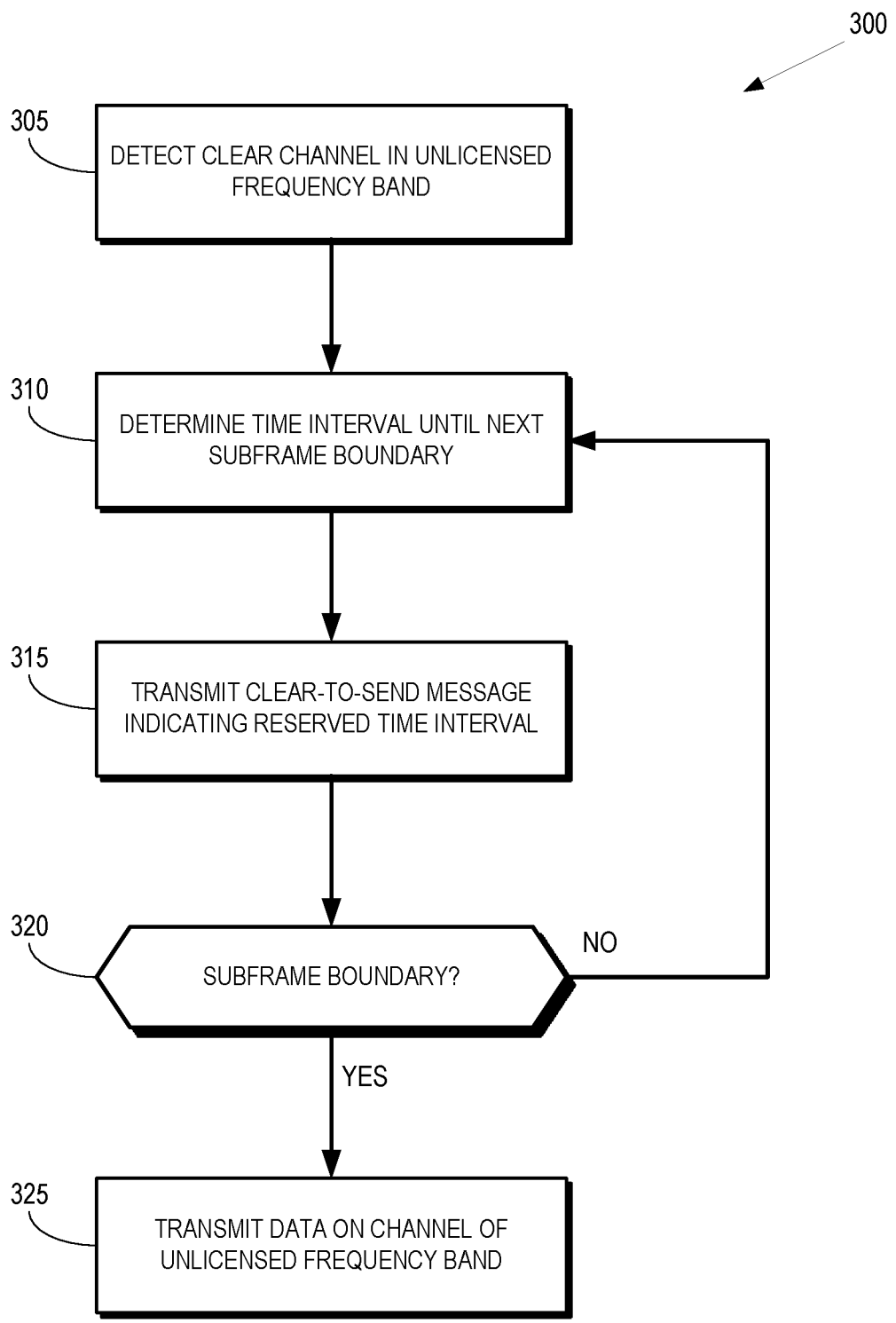
FIG. 3 is a flow diagram of a method for transmitting clear-to-send messages to reserve a channel of an unlicensed frequency band until a subsequent timing synchronization boundary according to some embodiments.

FIG. 3 is a flow diagram of a method 300 for transmitting clear-to-send messages to reserve a channel of an unlicensed frequency band until a subsequent timing synchronization boundary according to some embodiments. The method 300 is implemented in a base station such as some embodiments of the base station 105 shown in FIG. 1. The base station therefore operates according to a first RAT that enforces timing synchronization between different base stations on timing synchronization boundaries such as frame boundaries, subframe boundaries, or partial subframe boundaries. In the interest of clarity, the method 300 is described in the context of a base station that is synchronized on subframe boundaries. However, other embodiments of the method 300 can be applied to base stations that are synchronized on any timing synchronization boundary.

At block 305, the base station detects a clear channel of an unlicensed frequency band, e.g., using a clear channel assessment technique such as LBT. As used herein, the term "clear channel" refers to a channel on which the base station does not detect any receive signals or detects receive signals at a strength above a threshold signal strength that indicates that the channel is available for transmission by the base station. Detecting a clear channel allows the base station to acquire the channel of the unlicensed frequency band for subsequent transmission.

At block 310, the base station determines a time interval until the next subframe boundary. For example, the base station can determine a time interval between the acquisition time and the next subframe boundary. At block 315, the base station transmits a clear-to-send message on the channel of the unlicensed frequency band. The clear-to-send message includes information indicating a duration of the time that the channel of the unlicensed frequency band is reserved for use by the base station. For example, the clear-to-send message can include information indicating a time interval between the current time and the next subframe boundary plus a time interval between the next subframe boundary and the end of the data transmission, which may continue for one or more subframes.

At decision block 320, the base station determines whether a subframe boundary has been reached or will be reached within a time interval that is less than the duration of a clear-to-send message. If not, the method 300 flows to block 310. If a subframe boundary has been reached (or will be reached), the method flows to block 325.

At block 325, the base station begins data transmission on the channel of the unlicensed frequency band at the subframe boundary so that the data transmission is synchronized with one or more other base stations in the wireless communication system.

Figure 4:
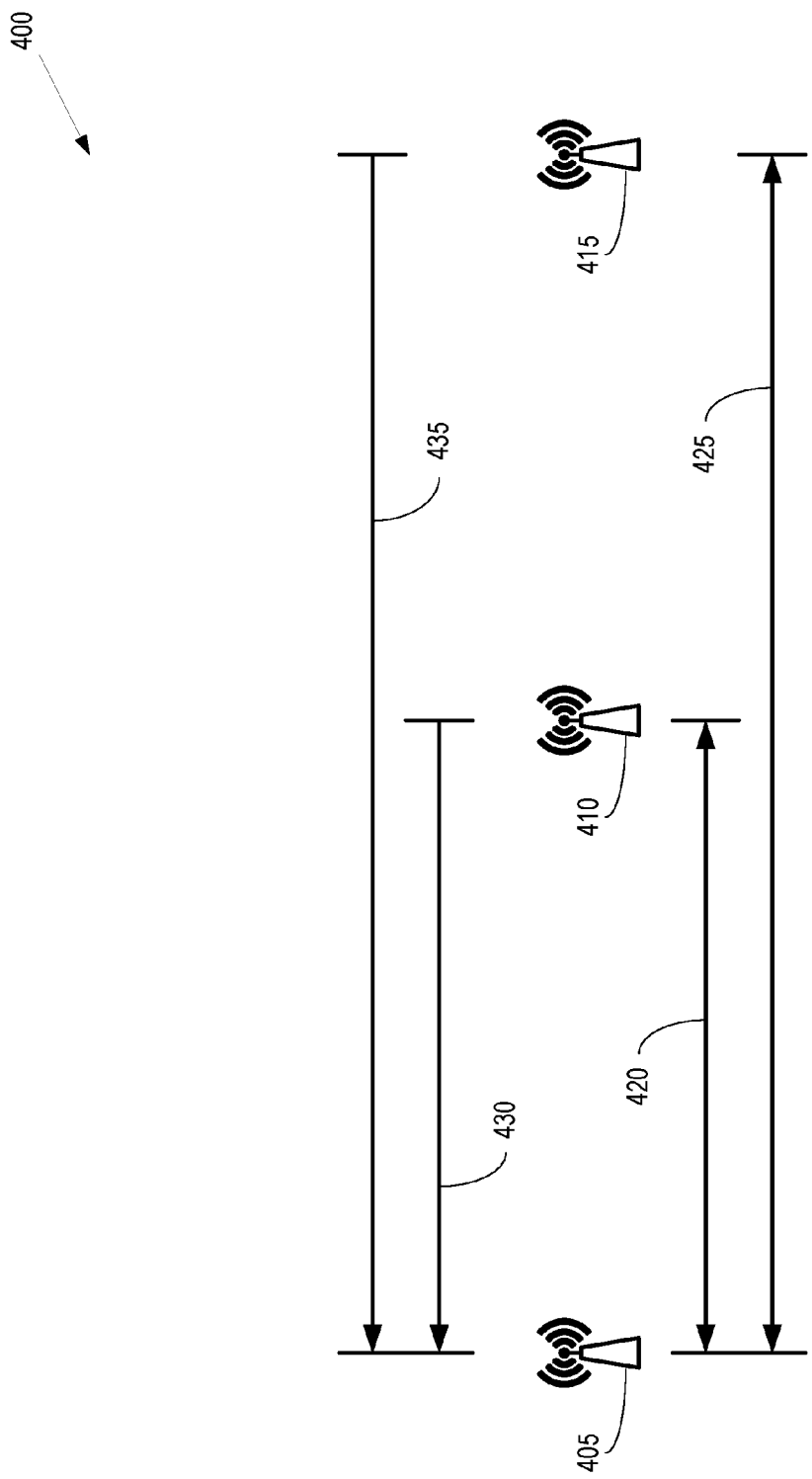
FIG. 4 is a diagram of a wireless communication system according to some embodiments.

FIG. 4 is a diagram of a wireless communication system 400 according to some embodiments. The wireless communication system 400 includes a base station 405 that provides wireless connectivity according to a first RAT that requires that the base station 405 is synchronized with other base stations that operate according to the first RAT on timing synchronization boundaries such as frame boundaries, subframe boundaries, or, in some cases, partial subframe boundaries. For example, as discussed herein, the base station 405 can operate according to the LTE-U, LAA, or MULTEFire standards. The wireless communication system 400 also includes access points 410, 415 that provide wireless connectivity according to a second RAT that does not require synchronization with other access points on any timing subframe boundaries. For example, the access points 410, 415 can operate according to one or more of the Wi-Fi standards, such as the IEEE 802 standards.

The base station 405 is separated from the access point 410 by a distance 420 and the base station 405 is separated from the access point 415 by a distance 425. The base station 405 can estimate the distances 420, 425 based on signals 430, 435 received from the access points 410, 415, respectively. In some variations, the signals 430, 435 are beacon signals that include information such as a service set identifier (SSID) to uniquely identify a wireless local area network, one or more channel numbers of channels in the unlicensed frequency band used by the corresponding access points 410, 415, information identifying security protocols used by the access points 410, 415, and the like. The base station 405 measures a received signal strength for the signals 430, 435. The measured signal strengths can be represented using values of quantity such as a received signal strength indicator (RSSI) that is generated for each of the received signals 430, 435 based on the measured signal strengths of the received signals 430, 435. Larger values of the RSSI indicate that the distance 420 is relatively small and the access point 410 is closer to the base station 405. Lower values of the RSSI indicate that the distance 425 is relatively large and the access point 415 is farther away from the base station 405.

The base station 405 can selectively generate and transmit a clear-to-send message according to the second RAT based on the received signal strength of the signals 430, 435. In some variations, the base station 405 generates and transmits the clear-to-send message in response to detecting one or more signals 430, 435 at a received signal strength that is above a threshold value that indicates that a collision between messages transmitted by the base station 405 and one or more of the access points 410, 415 can cause significant interference. For example, if the RSSI of the signal 430 transmitted by the access point 410 is above the threshold value, indicating that the distance 420 is relatively small and significant interference can occur between signals transmitted by the base station 405 and the access point 410, the base station 405 generates and transmits one or more clear-to-send messages according to the second RAT on the channel of the unlicensed frequency band to reserve a channel of the unlicensed frequency band, as discussed herein.

The base station 405 can also estimate path losses experienced by the signals 430, 435 as they propagate from the access points 410, 415 to the base station 405. For example, the base station 405 can use a known or estimated value of a transmitted signal strength of the signals 430, 435 to estimate the path losses by comparing the transmitted signal strength to the values of the received signal strength for the signals 430, 435. The base station 405 can then use the received signal strengths to determine a transmission power for a clear-to-send message that is transmitted according to the second RAT on a channel of the unlicensed frequency band. In some variations, the base station 405 identifies a first subset of the access points that have path losses below a threshold value and a second subset of the access points that have path losses above the threshold value. For example, if the path loss of the signal 430 is below the threshold, the access point is added to the first subset and, if the path loss of the signal 435 is above the threshold, the access point 415 is added to the second subset. The base station 405 that determines the transmission power so that the first subset of access points receives the clear-to-send message at a signal strength above a minimum signal strength for decoding the clear-to-send message and the second subset of access points receives the clear-to-send message at a signal strength below the minimum signal strength. Access points in the second subset do not receive (or at least are not able to decode) the clear-to-send message and so the access points in the second subset can use the channel of the unlicensed frequency band. Frequency reuse of 1 is therefore supported for access points in the second subset.

Figure 5:
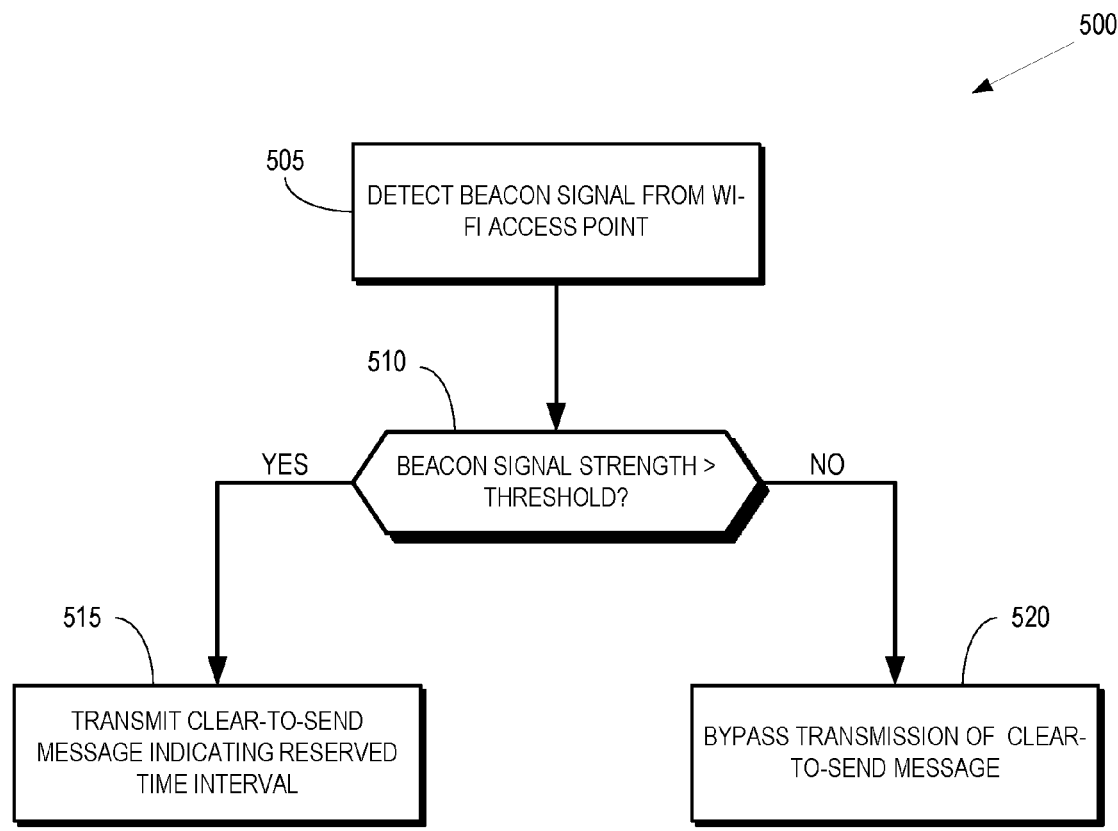
FIG. 5 is a flow diagram of a method for determining whether to transmit or bypass a clear-to-send message based on received beacon signals according to some embodiments.

FIG. 5 is a flow diagram of a method 500 for determining whether to transmit or bypass a clear-to-send message based on received beacon signals according to some embodiments. The method 500 is implemented in some embodiments of the base station 105 shown in FIG. 1 and the base station 405 shown in FIG. 4. In some variations, the method 500 is implemented in conjunction with, or in response to, the base station acquiring a channel of an unlicensed frequency band for transmission. The base station operates according to a first RAT that requires synchronization at timing synchronization boundaries. The base station therefore transmits clear-to-send messages to reserve the channel of the unlicensed frequency band between an acquisition time and a subsequent timing synchronization boundary when the base station becomes able to transmit data according to the first RAT. The clear-to-send messages can also include information indicating a time interval between the current time (e.g., the acquisition time) and the next timing synchronization boundary plus a time interval between the next timing synchronization boundary and the end of the data transmission, which may continue for one or more frames, subframes, or partial subframes.

However, in order to preserve frequency reuse for access points that are relatively distant from the base station, the base station selectively transmits the clear-to-send message based on one or more received signal strengths of one or more beacon signals received from one or more access points that operate according to a second RAT.

At block 505, the base station detects a beacon signal from an access point such as a Wi-Fi access point. At decision block 510, the base station compares a received signal strength of the beacon signal to a threshold value. The base station determines that the access point is relatively close if the received signal strength, RSSI(Beacon), is larger than a threshold, T_RSSI(Beacon):

$$RSSI(Beacon) > T\_RSSI(Beacon).$$

In that case, the base station transmits a clear-to-send message over the channel of the unlicensed frequency band at block 515. As discussed herein, the clear-to-send message is formed according to the second RAT and includes information indicating a duration of a time interval during which the base station has reserved the channel for transmission. The base station bypasses transmission of the clear-to-send message over the channel of the unlicensed frequency band at block 520 if the access point is relatively distant from the base station, e.g., as indicated by the received signal strength, RSSI(Beacon), being smaller than the threshold, T_RSSI(Beacon).

In some variations, the base station determines whether to transmit (at block 515) or bypass (at block 520) the clear-to-send message based on loading information included in the beacon signal. For example, Qload information in a beacon signal indicates a number of active voice (AC_VO) or active video (AC_VI) streams in a field that is referred to as an Allocated Traffic Self field. The base station can therefore determine (at decision block 510) whether the value of the received signal strength is larger than the threshold value and the number of active voice or video streams is larger than a threshold number of active streams. If so, the base station transmits the clear-to-send message over the channel of the unlicensed frequency band at block 515. If not, and either the received signal strength is below the threshold or the number of active voice or video streams is equal to or smaller than a threshold number of active streams (or both), the base station bypasses transmission of the clear-to-send message over the channel of the unlicensed frequency band at block 520.

Figure 6:
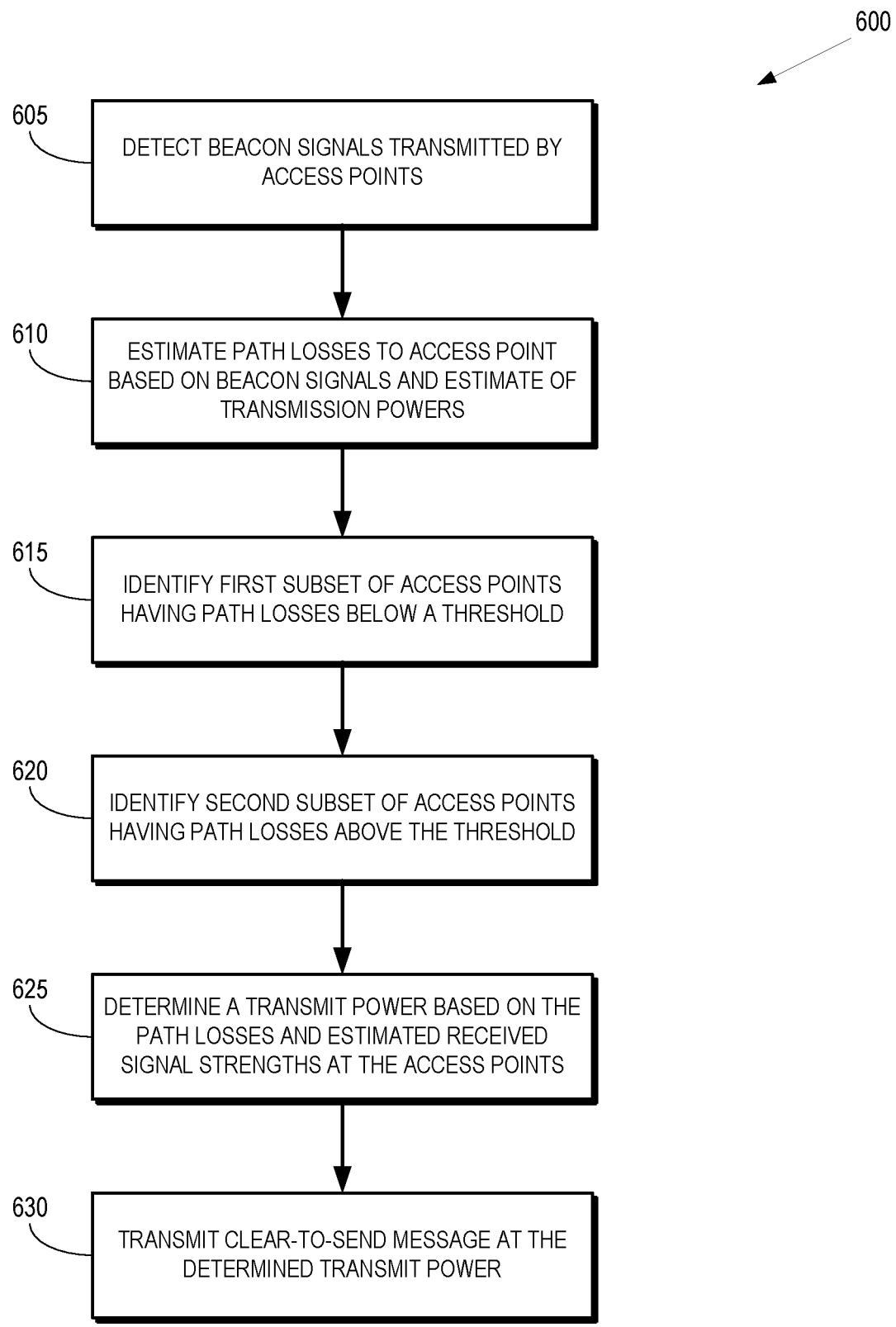
FIG. 6 is a flow diagram of a method for determining a transmission power of a clear-to-send message based on received beacon signals according to some embodiments.

FIG. 6 is a flow diagram of a method 600 for determining a transmission power of a clear-to-send message based on received beacon signals according to some embodiments. The method 600 is implemented in some embodiments of the base station 105 shown in FIG. 1 and the base station 405 shown in FIG. 4. In some variations, the method 600 is implemented in conjunction with, or in response to, the base station acquiring a channel of an unlicensed frequency band for transmission. The base station operates according to a first RAT that requires synchronization at timing synchronization boundaries. The base station therefore transmits clear-to-send messages to reserve the channel of the unlicensed frequency band between an acquisition time and a subsequent timing synchronization boundary when the base station becomes able to transmit data according to the first RAT. However, in order to preserve frequency reuse for access points that are relatively distant from the base station, the base station determines a transmission power for the clear-to-send message based on one or more received signal strengths of one or more beacon signals received from one or more access points that operate according to a second RAT.

At block 605, the base station detects beacon signals from Wi-Fi access points. At block 610, the base station estimates path losses to the access points based on a known value or an estimated of value of transmission powers of the beacon signals. The transmit power of an interfering Wi-Fi access point, Pt(Wi-Fi AP), can be known if it is provided to the base station or it can be estimated based on expected values. For example, as a worst case scenario, the base station can assume that the transmit power is equal to a maximum transmit power allowed by wireless communication regulations. The base station uses channel reciprocity between the uplink and downlink channels of the unlicensed band to estimate the path loss (PL) between the transmitter (Wi-Fi access point) and the receiver (base station) as:

$$PL=Pt(\text{Wi-Fi AP})-RSSI(\text{Beacon}).$$

Although a single value of the transmit power for the beacon signals is used in the above formula, some variations of the base station can use different values of the transmit power for beacon signals transmitted by different access points.

At block 615, the base station identifies a first subset of access points having path losses below a threshold value, which indicates that the access points in the first subset are relatively close to the base station and can cause substantial interference with signals transmitted on the channel of the unlicensed frequency band by the base station. At block 620, the base station identifies a second subset of access points having path losses above the threshold value, which indicates that the access points in the second subset are relatively distant from the base station and are therefore unlikely to cause substantial interference with signals transmitted on the channel of the unlicensed frequency band by the base station. Frequency reuse of 1 can therefore be implemented between the base station and the access points and the second subset.

At block 625, the base station determines a transmit power for the clear-to-send message based on path losses of access points in the first and second subsets and estimated received signal strengths at the access points. For example, the base station uses a known (or estimated) value of a received signal strength for the clear-to-send message, RSSI (CTS2self), that is sufficient for access points in the first subset to decode the received clear-to-send message transmitted by the base station. The transmit power for the clear-to-send message (Pt(CTS-2-self)) is then determined using a path loss (PL), such as the largest path loss experienced by an access point in the first subset:

$$Pt(\text{CTS-2-self})=RSSI(\text{CTS-2-self})+PL.$$

This approach ensures that the access points in the first subset are able to receive and decode the clear-to-send message indicating that the channel of the unlicensed frequency band has been reserved by the base station. Access points in the second subset are not able to decode the clear-to-send message and are therefore able to transmit signals on the channel of the unlicensed frequency band, thereby supporting a frequency reuse of 1 between the base station and the access points in the second subset.

In some variations, the base station can control the range of the clear-to-send message by adjusting a transmission power of a Wi-Fi preamble used by the clear-to-send message, e.g., by adjusting a transmission power of an 8 microsecond (μS) short training field (STF). In this approach, the signal-to-noise ratio of the Wi-Fi preamble is lower and consequently the RSSI_detect(CTS-2-self) needed to decode the Wi-Fi preamble can be reduced relative to decoding the entire clear-to-send message. As discussed herein, the clear-to-send message that is generated according to the second RAT can be multiplexed with other signals that are generated according to the first RAT. For example, the clear-to-send message can be multiplexed with an LAA preamble that is generated according to the first RAT. In some variations, automatic gain control (AGC signals) or synchronization signals are multiplexed with the LAA preamble. The AGC signals and the synchronization signals are not constrained to transmission at the power used to transmit the clear-to-send message and therefore can be transmitted with the same power as the payload data.

Figure 7:
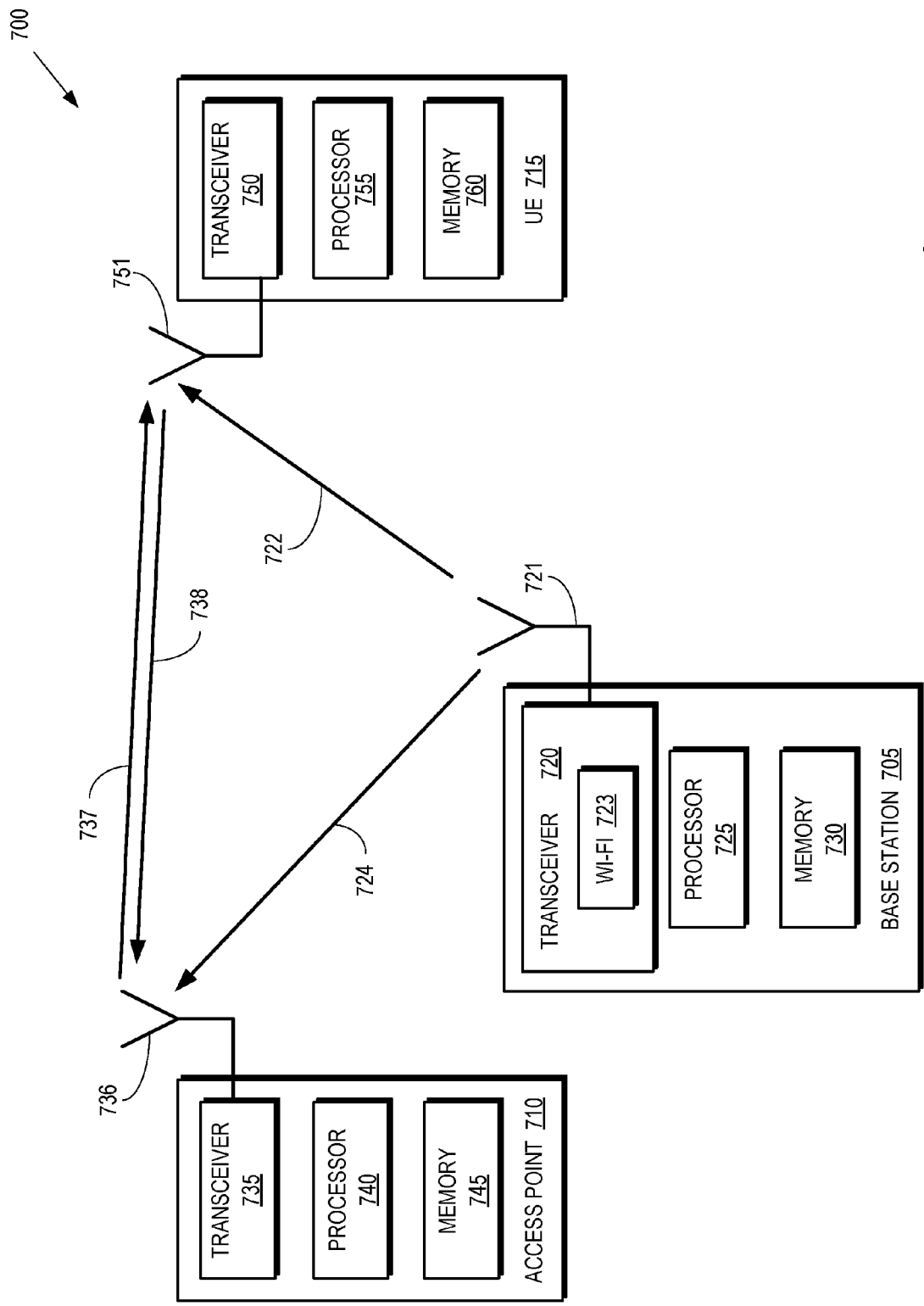
FIG. 7 is a block diagram of a wireless communication system that supports coexistence of nodes that operate according to different RATs on a channel or channels of unlicensed frequency bands according to some embodiments.

FIG. 7 is a block diagram of a wireless communication system 700 that supports coexistence of nodes that operate according to different RATs on a channel or channels of unlicensed frequency bands according to some embodiments. The wireless communication system 700 includes a base station 705 that operates according to a first RAT such as LTE-U, LAA, or MULTEFire, an access point 710 that operates according to a second RAT such as Wi-Fi, and a user equipment 715. As discussed herein, the first RAT constrains the base station 705 to begin data transmissions on timing synchronization boundaries such as frame boundaries, subframe boundaries, partial subframe boundaries. The second RAT does not require any constraints on the timing of data transmissions.

The base station 705 includes a transceiver 720 for transmitting and receiving signals using one or more antennas 721. The transceiver 720 is configured to transmit downlink signals 722 over one or more channels of one or more unlicensed frequency band. The transceiver 720 implements a Wi-Fi module 723 that is used to generate and transmit clear-to-send messages 724 that are used to reserve channels in the unlicensed frequency band between an acquisition time for the channel and a timing synchronization boundary, as discussed herein. The clear-to-send messages 724 are generated and transmitted according to the second RAT so that they are decodable by the access point 710. Some variations of the transceiver 720 transmit the clear-to-send messages 724 in conjunction with preambles or other signals generated according to the first RAT. The transceiver 720 is configured to perform clear channel assessment (e.g., according to LBT rules) prior to transmitting signals on channels in the unlicensed frequency band. The transceiver 720 may be implemented as a single integrated circuit (e.g., using a single ASIC or FPGA) or as a system-on-a-chip (SOC) that includes different modules for implementing the functionality of the transceiver 720.

The base station 705 also includes a processor 725 and a memory 730. The processor 725 may be used to execute instructions stored in the memory 730 and to store information in the memory 730 such as the results of the executed instructions. The processor 725 is also configurable to determine received signal strengths for signals such as beacon signals received at the base station 705 from other nodes such as the access point 710. The processor 725 can compare the received signal strengths to threshold values stored in the memory 730 to determine whether to transmit the clear-to-send messages. The processor 725 can also compare the received signal strengths to threshold values stored in the memory 730 to determine a transmission power for the clear-to-send messages. The base station 705 is therefore able to perform some embodiments of the method 300 shown in FIG. 3, the method 500 shown in FIG. 5, or the method 600 shown in FIG. 6.

The access point 710 includes a transceiver 735 for transmitting and receiving signals according to the second RAT using one or more antennas 736. For example, the transceiver 735 can transmit downlink data signals 737 on channels of the unlicensed frequency band. The signals 737 can interfere with the signals 722 transmitted by the base station 705. The transceiver 735 can also receive clear-to-send messages that are formed according to the second RAT and transmit beacon signals, as discussed herein. The transceiver 735 is also configured to perform clear channel assessment (e.g., according to LBT rules or precursor rules that are similar to or consistent with LBT rules) prior to transmitting signals on channels in the unlicensed frequency band. The transceiver 735 may be implemented as a single integrated circuit (e.g., using a single ASIC or FPGA) or as a system-on-a-chip (SOC) that includes different modules for implementing the functionality of the transceiver 735.

The access point 710 also includes a processor 740 and a memory 745. The processor 740 can be used to execute instructions stored in the memory 745 and to store information in the memory 745 such as the results of the executed instructions. Some embodiments of the processor 740 are configured to decode signals received by the transceiver 735 such as clear-to-send messages 724 transmitted by the base station 705 or clear-to-send messages 738 that are generated and transmitted by the user equipment 715 according to the second RAT. The processor 740 can therefore instruct the transceiver 735 to back off for a time interval indicated in a decoded clear-to-send message received from the base station 705 or the user equipment 715. The access point 710 is therefore able to perform some embodiments of the method 300 shown in FIG. 3, the method 500 shown in FIG. 5, or the method 600 shown in FIG. 6.

The user equipment 715 includes a transceiver 750 for transmitting and receiving signals using one or more antennas 751. For example, the transceiver 750 is able to receive the downlink data transmission signals 722 on channels of the unlicensed frequency bands according to the first RAT and received the downlink data transmission signals 737 according to the second RAT on the channels of the unlicensed frequency bands. For another example, the transceiver 750 is able to generate and transmit clear-to-send messages according to the second RAT in response to receiving the signal 722, as discussed herein. The transceiver 750 can be implemented as a single integrated circuit (e.g., using a single ASIC or FPGA) or as a system-on-a-chip (SOC) that includes different modules for implementing the functionality of the transceiver 750. The user equipment 715 also includes a processor 755 and a memory 760. The processor 755 may be used to execute instructions stored in the memory 760 and to store information in the memory 760 such as the results of the executed instructions. The user equipment 715 is therefore able to perform some embodiments of the method 300 shown in FIG. 3, the method 500 shown in FIG. 5, or the method 600 shown in FIG. 6.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for implementation by a base station that operates according to a first radio access technology (RAT) that requires synchronization on timing synchronization boundaries, the method comprising:
   acquiring a channel of an unlicensed frequency band at an acquisition time;
   generating a clear-to-send message that is decodable by access points that operate according to a second RAT that does not require synchronization on the timing synchronization boundaries; and
   transmitting the clear-to-send message during a first time interval between the acquisition time and a first timing synchronization boundary, wherein the clear-to-send message includes information indicating a duration of a channel reservation for the acquired channel, and wherein the duration is equal to the first time interval plus a second time interval between the first timing synchronization boundary and a second timing synchronization boundary.

2. The method of claim 1, wherein the second timing synchronization boundary is separated from the first timing synchronization boundary by at least one third timing synchronization boundary.

3. The method of claim 1, wherein the timing synchronization boundaries include at least one of a frame boundary, a subframe boundary, and a partial subframe boundary.

4. The method of claim 1, further comprising:
   measuring a signal strength of a beacon signal received from an access point that operates according to the second RAT; and
   transmitting the clear-to-send message in response to the measured signal strength exceeding a threshold signal strength.

5. The method of claim 1, further comprising:
   determining a transmission power for the clear-to-send message based on signals received from access points on the channel of the unlicensed frequency band, and
   wherein transmitting the clear-to-send message comprises transmitting the clear-to-send message at the transmission power.

6. The method of claim 5, further comprising:
   determining path losses to the access points based on the received signals, and
   wherein determining the transmission power comprises determining the transmission power based on the path losses.

7. The method of claim 6, wherein determining the transmission power comprises:
   identifying a first subset of the access points that have path losses below a threshold and a second subset of the access points that have path losses above the threshold; and
   determining the transmission power so that the first subset of access points receives the clear-to-send message at a signal strength above a minimum signal strength for decoding and the second subset of access points receives the clear-to-send message at a signal strength below the minimum signal strength for decoding.

8. The method of claim 1, wherein transmitting the clear-to-send message comprises transmitting the clear-to-send message as part of a preamble that is generated in accordance with the first RAT and is not decodable by the access point that operates according to the second RAT.

9. The method of claim 1, wherein transmitting the clear-to-send message comprises transmitting the clear-to-send message towards user equipment that are configured to forward the clear-to-send message.

10. A base station that operates according to a first radio access technology (RAT) that requires synchronization on timing synchronization boundaries, the base station comprising:
    a transceiver configured to operate using a channel of an unlicensed frequency band; and
    a processor configured to generate a clear-to-send message that is decodable by access points that operate according to a second RAT that does not require synchronization on the timing synchronization boundaries, wherein the transceiver is configured to transmit the clear-to-send message during a first time interval between an acquisition time of the channel and a first timing synchronization boundary, wherein the clear-to-send message includes information indicating a duration of a channel reservation for the acquired channel, and wherein the duration is equal to the first time interval plus a second time interval between the first timing synchronization boundary and a second timing synchronization boundary.

11. The base station of claim 10, wherein the second timing synchronization boundary is separated from the first timing synchronization boundary by at least one third timing synchronization boundary.

12. The base station of claim 10, wherein the timing synchronization boundaries include at least one of a frame boundary, a subframe boundary, and a partial subframe boundary.

13. The base station of claim 10, wherein the transceiver is further configured to:
- measure a signal strength of a beacon signal received from an access point that operates according to the second RAT; and
- transmit the clear-to-send message in response to the measured signal strength exceeding a threshold signal strength.

14. The base station of claim 10, wherein the processor is further configured to:
- determine a transmission power for the clear-to-send message based on signals received from access points on the channel of the unlicensed frequency band, and
- wherein the transceiver is configured to transmit the clear-to-send message at the transmission power.

15. The base station of claim 14, wherein the processor is further configured to:
- determine path losses to the access points based on the received signals and determine the transmission power based on the path losses.

16. The base station of claim 15, wherein the processor is further configured to identify a first subset of the access points that have path losses below a threshold and a second subset of the access points that have path losses above the threshold, and wherein the processor is further configured to determine the transmission power so that the first subset of access points receives the clear-to-send message at a signal strength above a minimum signal strength for decoding and the second subset of access points receives the clear-to-send message at a signal strength below the minimum signal strength for decoding.

17. The base station of claim 10, wherein the transceiver is configured to transmit the clear-to-send message as part of a preamble that is generated in accordance with the first RAT and is not decodable by the access point that operates according to the second RAT.

18. The base station of claim 10, wherein the transceiver is configured to transmit the clear-to-send message towards user equipment that are configured to forward the clear-to-send message.

19. A method for implementation by a base station that operates according to a first radio access technology (RAT) that requires synchronization on timing synchronization boundaries, the method comprising:
- acquiring a channel of an unlicensed frequency band at an acquisition time;
- determining a first time interval between the acquisition time and a first timing synchronization boundary; and
- sequentially transmitting one or more clear-to-send messages during the time interval, wherein the one or more clear-to-send messages are decodable by access points that operate according to a second RAT that does not require synchronization on the timing synchronization boundaries, wherein the one or more clear-to-send messages include information indicating a duration of a channel reservation for the acquired channel, and wherein the duration is equal to the first time interval plus a second time interval between the first timing synchronization boundary and a second timing synchronization boundary.

20. The method of claim 19, further comprising:
- transmitting data according to the first RAT on the unlicensed frequency band beginning at the second timing synchronization boundary.

* * * * *